US006408700B1

United States Patent
Matt et al.

(10) Patent No.: US 6,408,700 B1
(45) Date of Patent: Jun. 25, 2002

(54) MASS FLOW RATE MEASUREMENT CIRCUIT AND METHOD FOR A MASS FLOW/DENSITY METER

(75) Inventors: Christian Matt, Aesch (CH); Daniel Kuttler, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 09/579,384

(22) Filed: May 26, 2000

Related U.S. Application Data

(60) Provisional application No. 60/161,314, filed on Oct. 25, 1999.

(30) Foreign Application Priority Data

Jun. 7, 1999 (EP) .............................. 99110860

(51) Int. Cl.⁷ ............................................... G01F 1/84
(52) U.S. Cl. ........................... 73/861.356; 73/861.357; 73/861.355
(58) Field of Search .................... 73/861.356, 861.357, 73/861.355

(56) References Cited

U.S. PATENT DOCUMENTS

| | | |
|---|---|---|
| 4,127,028 A | 11/1978 | Cox et al. |
| 4,794,191 A | 12/1988 | Flecken et al. |
| 4,911,006 A | 3/1990 | Hargarten et al. |
| 5,531,126 A | 7/1996 | Drahm |
| 5,557,973 A | 9/1996 | Koudal et al. |
| 5,610,342 A | 3/1997 | Wenger et al. |
| 5,675,093 A | 10/1997 | Young et al. |
| 5,705,754 A | 1/1998 | Keita et al. |
| 6,006,609 A | 12/1999 | Drahm et al. |

FOREIGN PATENT DOCUMENTS

WO    WO 88/02105    3/1988

Primary Examiner—Benjamin R. Fuller
Assistant Examiner—Corey D. Mack
(74) Attorney, Agent, or Firm—Bose, McKinney & Evans L

(57) ABSTRACT

This circuit is suitable for flow tubes (4) the vibration frequency of which is in the order of 1 kHz. A fluid to be measured flows through the tube (4) vibrating in operation at a frequency determined by the density of the fluid. Attached to the tube (4) are electromagnetic vibration sensors (17, 18) positioned at a given distance from each other delivering sinusoidal sensor signals ($x_{17}$, $x_{18}$). Impedance-matching devices (31, 32) are fed by the sensor signals. Inputs of an intermediate switch (35) are connected to the outputs of impedance-matching devices. Additional impedance-matching device (33, 34) are fed by outputs of the intermediate switch. Low-pass filters (37, 38) are connected to the outputs of the additional impedance matching devices. The upper cutoff frequency of low-pass filter (37) differs by about 10% to 15% from the upper cutoff frequency of low-pass filter (38). Zero-crossing detector (39, 40) are fed by the outputs of the low-pass filters. The start and the stop inputs of a time-to-digital converter (41) are connected to the outputs of the zero-crossing de-tectors, respectively. An output of a high-frequency clock generator (42) is coupled to the clock input of the time-to-digital converter from the output signal of which and a signal (k) representative of a calibration factor, a micro-processor (43) generates a signal (q) representative of mass flow rate.

22 Claims, 2 Drawing Sheets

MASS FLOW RATE MEASUREMENT CIRCUIT AND METHOD FOR A MASS FLOW/DENSITY METER

This application claims benefit of Ser. No. 60/161,314 filed Oct. 25, 1999.

FIELD OF THE INVENTION

This invention relates to a mass flow rate measurement circuit of a Coriolis mass flow/density meter.

BACKGROUND OF THE INVENTION

Coriolis mass flow/density meters, as is well known, have at least one bent or straight flow tube that is vibrated while a fluid flows through it; details are given below in connection with the description of FIG. 1.

Usually, at least one vibrator and at least two vibration sensors are mounted on the flow tube, the vibration sensors being positioned at a given distance from each other in the direction of flow. The flow tube generally vibrates at a mechanical resonance frequency that is predetermined by its material and dimensions but is varied by the density of the fluid. In other cases, the vibration frequency of the flow tube is not exactly the mechanical resonance frequency of the flow tube, but a frequency in the neighborhood thereof.

The vibration sensors deliver sinusoidal or pulse signals whose frequency is equal to the vibration frequency of the flow tube, and which are separated in time, i.e., between which a phase difference exists when the fluid flows through the flow tube. From this phase difference, a time-difference signal, e.g., a signal representing the time difference between edges of the pulsed sensor signals or between zero crossings of the sinusoidal sensor signals, can be derived which is directly proportional to mass flow rate.

U.S. Pat. No. 4,911,006 discloses a mass flow rate measurement circuit of a Coriolis mass flow/density meter comprising a mass flow sensor having two parallel, U-shaped flow tubes through which flows a fluid to be measured and which vibrate in operation at a frequency determined by their material and dimensions but varied by the density of the fluid, said frequency being equal to or in the neighborhood of the instantaneous mechanical resonance frequency of the flow tubes, and which have attached to them a first and a second electromagnetic vibration sensor positioned at a given distance from each other in the direction of flow, which deliver a sinusoidal first and a sinusoidal second sensor signal, as well as a vibrator, said measurement circuit comprising:

an intermediate switch having a first input fed by the first sensor signal and a second input fed by the second sensor signal;

a first and a second buffer fed, respectively, by the first and second outputs of the intermediate switch and each having an output;

a first and a second zero-crossing detector connected at their input ends to the outputs of the first and second buffers, respectively, and each having an output;

a first-in-time detector connected at its input end to the outputs of the first and second zero-crossing detectors;

an EXOR gate connected at its input end to the outputs of the first and second zero-crossing detectors and having an output;

a 50-MHz oscillator having an output;

an AND gate having
  a first input connected to the output of the oscillator, and
  a second input connected to the output of the EXOR gate;

a counter having a count output and a pulse input which is connected to the output of the AND gate; and a microprocessor which generates from the count a signal representative of mass flow rate.

This prior-art measurement circuit is suitable virtually only for mass flow sensors with the above-mentioned U-shaped flow tubes, which vibrate at about 50 Hz to 100 Hz, as is also shown by the above-mentioned 50-MHz oscillator. The period of oscillation of such an oscillator is 20 ns; this is used as a fundamental unit to measure the time difference; therefore, the resolution of this measurement is also 20 ns. This is sufficient for time differences occurring at 50 Hz to 100 Hz.

For mass flow sensors with flow tubes vibrating at higher frequencies, particularly with straight flow tubes, which vibrate at 800 Hz to 1500 Hz, this prior-art measurement circuit is unsuitable. The person of average skill in the art could think of simply increasing the frequency of the 50-MHz oscillator, but this would lead to a frequency of the order of 1 GHz. The implementation of such oscillators would require a superhigh-frequency circuit technology that is not compatible with the low-frequency circuit technology necessary for the remainder of the circuit.

SUMMARY OF THE INVENTION

It is therefore an object of the invention to provide a mass flow rate measurement circuit of a Coriolis mass flow/density meter which is also suitable for mass flow sensors employing flow tubes that vibrate at a frequency of the order 1 kHz. Furthermore, this measurement circuit is to be simpler with respect to the necessary circuit technology, particularly as far as the above-mentioned first-in-time detector is concerned.

To attain the object, the invention provides a mass flow rate measurement circuit of a Coriolis mass flow/density meter comprising a mass flow sensor having at least one flow tube through which flows a fluid to be measured and which vibrates in operation at a frequency determined by its material and dimensions but varied by the density of the fluid, said frequency being equal to or in the neighborhood of the instantaneous mechanical resonance frequency of the flow tube, has attached to it a first and a second electromagnetic vibration sensor positioned at a given distance from each other in the direction of flow which deliver a sinusoidal first and a sinusoidal second sensor signal, respectively, as well as a vibrator, and is surrounded by a support frame or support tube, said measurement circuit comprising:

a first and a second impedance-matching device fed by the first and second sensor signals, respectively, and having a very high input resistance, a low output resistance, and an output;

an intermediate switch having a first and a second input connected to the outputs of the first and second impedance-matching devices, respectively;

a third and a fourth impedance-matching device fed, respectively, by a first and a second output of the intermediate switch and having a very high input resistance, a low output resistance, and an output;

a first and a second low-pass filter connected at their input ends to the outputs of the third and fourth impedance matching devices, respectively, and having an output, a passband, and an upper cutoff frequency, with
 the upper cutoff frequency of the first low-pass filter differing by about 10% to 15% from the upper cutoff frequency of the second low-pass filter, and
 the passband covering at least the vibration frequency values occurring in operation;

a first and a second zero-crossing detector fed by the outputs of the first and second low-pass filters, respectively, and each having an output;

a time-to-digital converter having a start input, a stop input, and a clock input and delivering a digital signal,
 the start input being connected to the output of the first zero-crossing detector, and
 the stop input being connected to the output of the second zero-crossing detector;

a high-frequency clock generator having an output coupled to the clock input of the time-to-digital converter; and a microprocessor which generates a signal representative of mass flow rate from the digital signal and a signal representative of a calibration factor and controls the switching of the intermediate switch.

One advantage of the invention is that the above-mentioned EXOR gate and the above-mentioned first-in-time detector are replaced by the two bandpass filters. Another advantage is that the problem associated with the increase of the frequency of the above-mentioned 50-MHz oscillator to a frequency of the order of 1 GHz is circumvented by the use of a time-to-digital converter. If clocked at 50 MHz, for example, this time-to-digital converter has a time resolution of typically 100 ps.

BRIEF DESCRIPTION OF THE DRAWINGS

The invention and further advantages will become more apparent from the following description of embodiments when taken in conjunction with the accompanying drawings, in which.

DETAILED DESCRIPTION OF EXEMPLARY EMBODIMENTS

Figure 1:
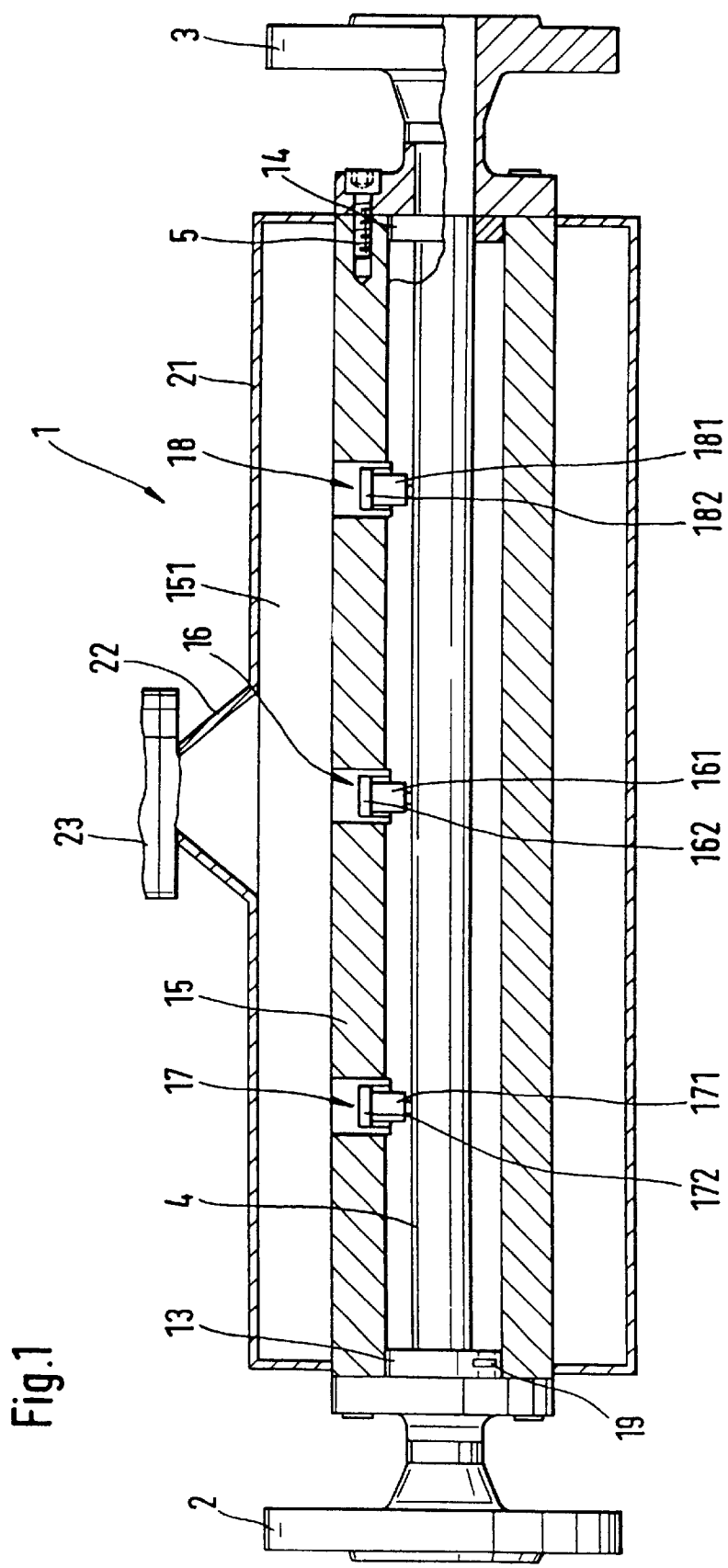
FIG. 1 is an elevational, partly sectioned view of a mass flow sensor of a mass flow meter with one flow tube.

Referring to FIG. 1, there is shown an elevational, partially sectioned view of a mass flow sensor 1 of a Coriolis mass flow/density meter suitable for carrying out the method of the invention, which can be installed, e.g. by flanges 2, 3, in a pipe of a given diameter (not shown in order to simplify the illustration) through which flows a liquid, gaseous, or vaporous fluid to be measured. Instead of flanges, other known means, such as Triclamp or screw connections, may be provided for connecting the mass flow sensor 1 to the pipe.

The mass flow sensor 1 of FIG. 1 has a single straight flow tube 4, whose fluid-inlet-side end is fixed to the flange 2, e.g. via a fluid-inlet-side end plate 13, and whose fluid-outlet-side end is fixed to the flange 3, e.g. via a fluid-outlet-side end plate 14. The flow tube 4 is fitted in the end plates 13, 14 in a tight manner, particularly vacuum-tight, e.g. by welding, soldering, or rolling in, see U.S. Pat. No. 5,610,342.

The measurement circuit of the invention can also be used in a clamp-on Coriolis mass flow sensor according to the prior U.S. patent application Ser. No. 09/283,401 filed Apr. 1, 1999 or in a mass flow sensor with a single flow tube having a cantilever as disclosed in U.S. Pat. No. 6,006,609. Instead of a single straight flow tube, the mass flow sensor of the Coriolis mass flow/density meter may have a single flow tube bent in one plane, such as a circular-sector-shaped flow tube, as is described, for example, in U.S. Pat. No. 5,705,754.

Two or more, particularly two, straight flow tubes as described in U.S. Pat. No. 4,793,191 or two or more, particularly two, bent flow tubes as described in U.S. Pat. No. 4,127,028 are also possible.

Furthermore, the measurement circuit of the invention can be used in a mass flow sensor with one flow tube and one dummy tube as is described in U.S. Pat. No. 5,531,126. Finally, the measurement circuit of the invention can be employed in mass flow/density meters whose mass flow sensors have at least one helical flow tube as described in U.S. Pat. No. 5,557,973 or U.S. Pat. No. 5,675,093.

In FIG. 1, the flanges 2, 3 and the end plates 13, 14 are fastened to or in a support tube 15 by means of screws, one or which, 5, is completely visible in section at the upper right. Instead of a screw connection, any other suitable mechanical joint may be provided between support tube 15 and flanges 2, 3.

The end plates 13, 14 may be welded or soldered to the internal wall of the support tube 15 in a tight manner, particularly vacuum-tight. It is also possible, however, to form support tube 15 and end plates 13, 14 as a single piece. Instead of the support tube 15, a support frame can be used.

As a means for exciting the flow tube 4 into vibrations, particularly into resonance vibrations, preferably into flexural resonance vibrations, a vibrator 16, e.g. an electromagnetic vibrator, is disposed midway between the flanges 2, 3 and the end plates 13, 14 as well as in the interspace 115 between the support tube 15 and the flow tube 4. It comprises a coil 162, which is fixed to the support tube 15, and a permanent magnet 161, which is mounted on the flow tube 4 and whose motion is reciprocating within the coil.

In FIG. 1, the vibrator 16 excites the flow tube 4 into flexural vibrations in the plane of the paper, so that also with a fluid flowing through the flow tube 4, Coriolis forces are produced in this plane which cause a time shift and a phase shift between inlet-side and outlet-side sections of the flow tube 4.

Furthermore, a first and a second vibration sensor 17, 18 for sensing the vibrations of the flow tube 4 are disposed in the interspace 115 between the flow tube 4 and the support tube 15. The vibration sensor 17 is mounted between the end plate 13 and the vibrator 16, and the vibration sensor 18 is mounted between the end plate 14 and the vibrator 16; the two sensors are preferably positioned at the same distance from the vibrator 16, i.e., from the middle of the flow tube 4.

In FIG. 1, the vibration sensors 17, 18 are electromagnetic sensors each comprising a coil 172, 182, which is attached to the support tube 15, and a permanent magnet 171, 181, which is attached to the flow tube 4 and the motion of which is reciprocating within the coil. The vibration sensors 17 and 18 provide a first sinusoidal sensor signal $x_{17}$ and a second sinusoidal sensor signal $x_{18}$, respectively.

Mounted on the end plate 13 is a temperature sensor 19 that delivers a temperature signal $x_{19}$ representative of the current temperature of the flow tube 4. The temperature sensor 19 is preferably implemented with a platinum resistance element that is attached to the end plate 13 with adhesive, for example. A temperature sensor may also be attached to the support tube 15.

Also shown in FIG. 1 is a housing 21 that is fixed to the support tube 15 and serves, inter alia, to protect leads connected to the vibrator 16 and the vibration sensors 17, 18. The leads are not shown in order to simplify the illustration.

The housing 21 is provided with a necklike transition portion 22 to which an electronics housing 23 (drawn only partly) for receiving a measuring and operation circuit of the mass flow/density meter is fixed.

If the transition portion 22 and the electronics housing 23 would adversely affect the vibration behavior of the support tube 15, they may also be separate from the mass flow sensor 1. In that case, the electronics and the mass flow sensor 1 are interconnected by a cable.

Figure 2:
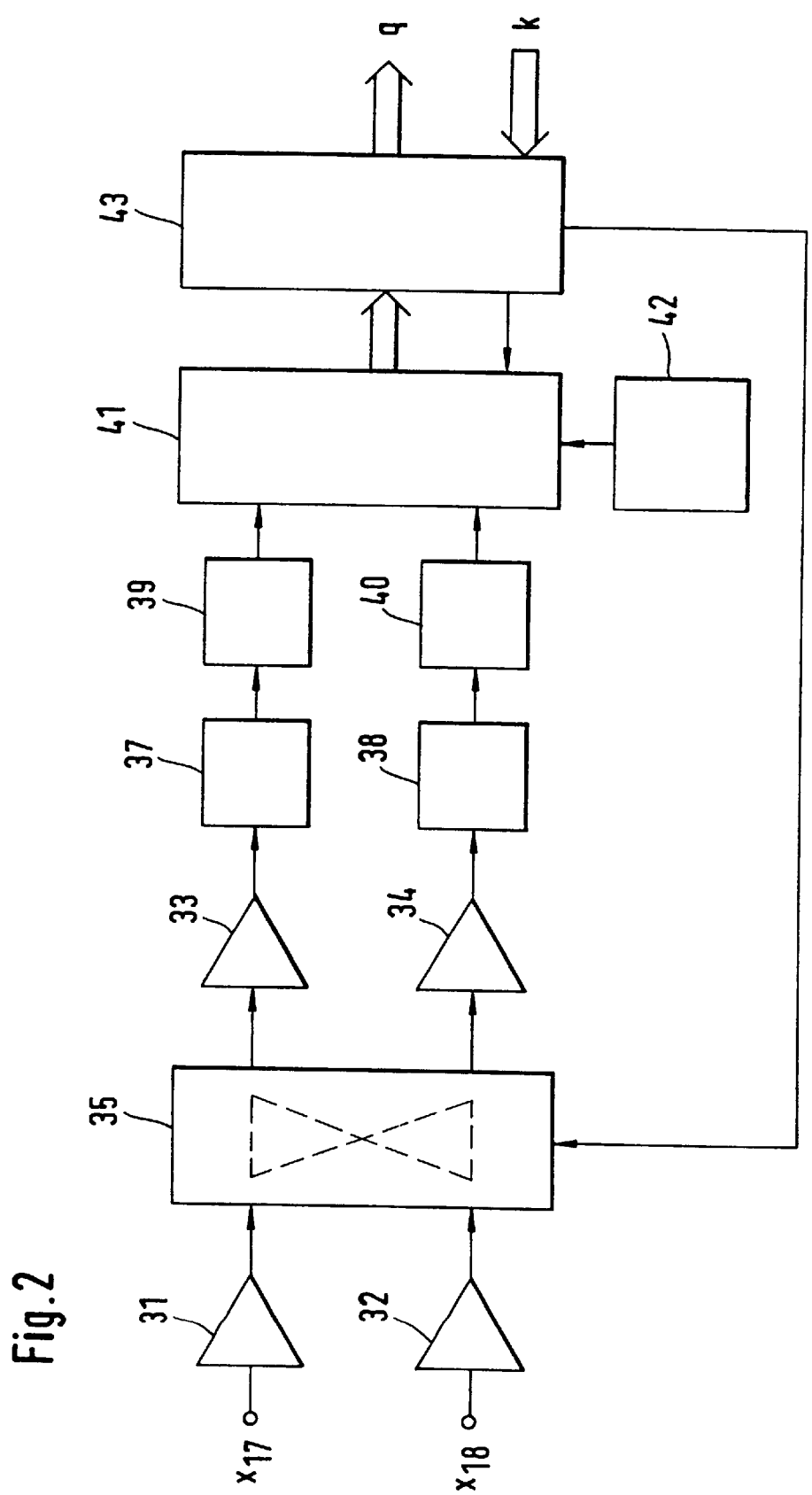
FIG. 2 is a block diagram of a measurement circuit according to the invention for use in, e.g., the mass flow meter of FIG. 1.

FIG. 2 is a block diagram of a measurement circuit according to the invention for mass flow/density meters employing the above-mentioned various designs of flow tubes. The measurement circuit comprises a first impedance-matching device 31, which is fed by the first sensor signal $x_{17}$, and a second impedance-matching device 32, fed by the second sensor signal $x_{18}$. The two impedance-matching devices 31, 32 each have a very high input resistance, a low output resistance, and an output.

A first input of an intermediate switch 35 is connected to the output of the impedance-matching device 31, and a second input is connected to the output of the impedance-matching device 32. A third impedance-matching device 33 is fed by a first output of the intermediate switch 35, and a fourth impedance-matching device 34 is fed by a second output of the intermediate switch 35. The two impedance-matching devices 33, 34 each have a very high input resistance, a low output resistance, and an output.

In a first position of the intermediate switch 35, its first and second inputs are connected to its first and second outputs, respectively; in a second position, its first input is connected to its second output, and its second input to its first output.

A first low-pass filter 37 has its input connected to the output of the impedance-matching device 33, and a second low-pass filter 38 has its input connected to the output of the impedance-matching device 34. The low-pass filters 37, 38 each have an output, an upper cutoff frequency, and a passband.

The upper cutoff frequency of the low-pass filter 37 differs from the upper cutoff frequency of the low-pass filter 38 by about 10% to 15%; preferably, the upper cutoff frequency of the filter 37 is higher by this amount. The passbands of the two low-pass filters 37, 38 cover at least the values of the vibration frequency of the flow tube 4 which occur in operation. In the case of an implemented mass flow sensor with a straight flow tube that vibrates between 800 Hz and 1.3 kHz depending on the type and density of the fluid, the upper cutoff frequency of the low-pass filter 37 is 1.7 kHz and the lower cutoff frequency of the low-pass filter 38 is 1.5 kHz, so that the passbands extend between 0 Hz and 1.7 kHz and between 0 Hz and 1.5 kHz, respectively.

The switching paths of the intermediate switch 35 are commonly realized by means of active electronic components, such as transistors, particularly insulated-gate field-effect transistors. These have a non negligible ON resistance, whose value varies from switching path to switching path due to manufacturing variations. The two impedance-matching devices 33 and 34 prevent these ON resistances from adding to the input resistances of the low-pass filters 37 and 38, respectively.

A first zero-crossing detector 39 has an output and is fed by the output of the low-pass filter 37. A second zero-crossing detector 40 has an output and is fed by the output of the low-pass filter 38. A start input of a time-to-digital converter 41 is connected to the output of the zero-crossing detector 39, and a stop input of the time-to-digital converter 41 is connected to the output of the zero-crossing detector 40. A high-frequency clock generator 42 feeds a clock input of the time-to-digital converter 41.

A time-to-digital converter is a circuit comparable to an analog-to-digital converter that permits a time difference (instead of an analog signal as in the case of an analog-to-digital converter) to be converted into a digital signal with very high resolution. Commercially available time-to-digital converters are, for example, the TDC 10000 (manufacturer: Siemens AG, Munich, Germany) and the TDC-GP 1 (manufacturer: acam-messelectronic gmbh, Karlsruhe, Germany). For the implementation of the measurement circuit according to the invention, the TDC-GP 1 is used.

Since any time measurement system can measure only positive times, the circuit referred to at the beginning includes the first-in-time detector, which determines which sensor signal occurs earlier. In the invention, this need not be determined, since steps are taken to ensure that a start signal associated with the first occurring sensor signal is always present at the start input of the time-to-digital converter 41.

This is achieved by choosing different values for the upper cutoff frequencies of the low-pass filters 37, 38. This results in different propagation delays of signals processed by the low-pass filters, and thus in a propagation-delay difference $\delta t_B$ between the output signal of the low-pass filter 37 and the output signal of the low-pass filter 38. The propagation-delay difference $\delta t_B$ is chosen to be so large that for all phase shifts to be expected between the sensor signals $x_{17}$, $x_8$, particularly if the direction of fluid flow is opposite to a preferred direction, the signal at the start input of the time-to-digital converter 41 will always be the earlier one.

This results in another advantage of the invention: No direction of flow need be prescribed to the user of the Coriolis mass flow/density meter, since the latter measures with the correct sign in both directions of flow.

In the measurement circuit, there is not only the propagation-delay difference $\delta t_B$ between the low-pass filters, but because of manufacturing variations, a corresponding propagation-delay difference exists between each pair of like subcircuits: The impedance-matching devices 33, 34 show a propagation-delay difference $\delta t_R$, and the zero-crossing detectors 39, 40 show a propagation-delay difference $\delta t_N$.

Since the sensor signals show a mass-flow-rate-dependent propagation-delay difference $\delta t_Q$, a total propagation delay difference $\delta t_G$ exists between the start input and the stop input of the time-to-digital converter 41:

$$\delta t_G = \delta t_B + \delta t_N + \delta t_R + \delta t_Q \quad (1)$$

As a result of the switching of the intermediate switch 35, this equation splits into two equations for $\delta t_{G1}$ and $\delta t_{G2}$, so that in one switch position, $$\delta t_{G1} = \delta t_B + \delta t_N + \delta t_R + \delta t_Q \quad (2)$$

and in the other switch position, $$\delta t_{G2} = \delta t_B + \delta t_N + \delta t_R - \delta t_Q \quad (3)$$

The minus sign before $\delta t_Q$ in Equation (3) follows from the switching of the intermediate switch 35; the other three terms $\delta t_B$, $\delta t_N$, $\delta t_R$ do not change the sign, since they are not affected by the switching.

To minimize any propagation-delay difference in the case of the impedance-matching devices 31, 32, suitably manufactured components, such as the operational amplifier OP 275 of Analog Devices, are used for the impedance-matching devices.

A microprocessor 43 generates a signal q representative of mass flow rate from the digital signal of the time-to-digital converter 41, and controls the switching of the intermediate switch 35.

This is done as follows. The microprocessor 43 places the intermediate switch 35 in one position for the duration of a pre determinable number N of digital signals successively appearing at the digital output of the time-to-digital converter 41. For the purposes of this explanation, let this be the position in which Equation (2) holds, i.e., in which the mass-flow-rate-dependent propagation-delay difference $\delta t_Q$ is positive. The microprocessor 43 accumulates the N digital signals in a first range of accumulation, i.e., it sums the N digital signals.

After that, the microprocessor 43 changes the intermediate switch 35 to the other position for the duration of N further digital signals successively appearing at the digital output of the time-to-digital converter 41. Now, Equation (3) holds, in which the mass-flow-rate-dependent propagation-time difference $\delta t_Q$ is negative. The microprocessor 43 accumulates the N further digital signals in a second range of accumulation, i.e., it also sums these N digital signals.

Next, the sum obtained in the second range of accumulation is subtracted from the sum obtained in the first range of accumulation, i.e., the difference between Equations (2) and (3) is formed:

$$\delta t_{G1} - \delta t_{G2} = \delta t_B + \delta t_N + \delta t_R + \delta t_Q - \delta t_B - \delta t_N = \delta t_R \delta t_Q$$

$$\delta t_{G1} - \delta t_{G2} = 2\delta t_Q \quad (4)$$

The difference is then divided by 2N. The result of the division is multiplied by a signal k representative of a calibration factor, which is fed to the microprocessor 43. The result of the multiplication is a signal q representative of mass flow rate, which is transferred to an output.

It should be noted that each zero-crossing detector 37, 38 generates output signals, particularly output pulses, both on a positive-to-negative zero crossing and on a negative-to-positive zero crossing. Thus, each zero-crossing detector provides two output signals per period of oscillation.

The microprocessor 43 controls the time-to-digital converter 41 in such a way that the latter processes either only the positive-to-negative zero crossings or only the negative-to-positive zero crossings or both types of zero crossings. In the latter case, N must be an even number.

While the invention has been illustrated and described in detail in the drawing and foregoing description, such illustration and description is to be considered as exemplary and not restrictive in character; it being understood that only exemplary embodiments have been shown and described and all changes and modifications that come within the spirit of the invention are desired to be protected.

What we claim is:

1. A Coriolis mass flow/density meter through which a fluid to be measured flows in a direction during operation, comprising:

a mass flow sensor having at least one flow tube through which the fluid to be measured can flow, said flow tube being configured to vibrate in operation at a frequency determined by its material and dimensions but varied by the density of the fluid;

a first and a second vibration sensor attached to said flow tube and positioned at a given distance from each other in the direction of flow, said sensors delivering a sinusoidal first and a sinusoidal second sensor signal, respectively;

a vibrator for vibrating the flow tube; and a measurement circuit including a first and a second impedance-matching device fed by the first and second sensor signal, respectively, an intermediate switch having a first and a second input coupled to an output end of the first impedance-matching device and an output end of the second impedance-matching device, respectively, a third and a fourth impedance-matching device coupled, respectively, to a first and a second output end of the intermediate switch, a first low-pass filter coupled to an output end of the third impedance matching device, said first low-pass filter having a passband, and an upper cutoff frequency, a second low-pass filter coupled to an output end of the fourth impedance matching device, said second low-pass filter having a passband, and an upper cutoff frequency, with the upper cutoff frequency of the first low-pass filter differing from the upper cutoff frequency of the second low-pass filter, and the passband covering at least the vibration frequency values occurring in operation;

a first zero-crossing detector coupled to an output end of the first low-pass filter;

a second zero-crossing detector coupled to an output end of the second low-pass filter;

a time-to-digital converter having a start input, a stop input, and a clock input and delivering a digital signal, the start input being coupled to an output end of the first zero-crossing detector, the stop input being coupled to an output end of the second zero-crossing detector;

a high-frequency clock generator having an output end coupled to the clock input of the time-to-digital converter; and a microprocessor which generates a signal representative of mass flow rate from the digital signal and a signal representative of a calibration factor and controls the switching of the intermediate switch.

2. The Coriolis mass flow/density meter as claimed in claim 1, wherein the upper cutoff frequency of the first low-pass filter differs by about 10% to 15% from the upper cutoff frequency of the second low-pass filter.

3. A mass flow rate measurement circuit of a Coriolis mass flow/density meter that provides a first and second sensor signal in operation, said first and second sensor signal being generated by a first and a second vibration sensor, respectively, said vibration sensors being attached to the Coriolis mass flow/density sensor and being operable to detect vibrations of at least one vibrating flow tube conducting a fluid to be measured, said measurement circuit comprising:

a first and a second impedance-matching device being configured to be fed by the first and second sensor signal, respectively, the first and the second impedance-matching devices each having a respective output end;

an intermediate switch having a first and a second input coupled to the output end of the first and the output end of the second impedance-matching devices, respectively, the intermediate switch having a first and a second output end;

a third and a fourth impedance-matching device coupled, respectively, to the first and the second output end of the intermediate switch, the third impedance matching device an output end, the fourth impedance matching device an output end;

a first low-pass filter coupled to an output end of the third impedance matching device, said first low-pass filter having an output end and said first low-pass filter having an upper cutoff frequency;

a second low-pass filter coupled to the output end of the fourth impedance matching device, said second low-pass filter having an output end and said second low-pass filter having an upper cutoff frequency differing from the upper cutoff frequency of the first low-pass filter;

a first zero-crossing detector coupled to the output end of the first low-pass filter, said first zero-crossing detector having an output end;

a second zero-crossing detector coupled to the output end of the second low-pass filter, said second zero-crossing detector having an output end;

a time-to-digital converter having a start input, a stop input, and a clock input and delivering a digital signal, said start input being coupled to the output end of the first zero-crossing detector, and said stop input being coupled to the output end of the second zero-crossing detector;

a high-frequency clock generator having an output end coupled to the clock input of the time-to-digital converter; and a microprocessor fed by the digital signal, said microprocessor generating a signal representative of a mass flow rate of said fluid and controlling the switching of the intermediate switch.

4. The measurement circuit as claimed in claim 3, wherein the upper cutoff frequency of the first low-pass filter differs by about 10% to 15% from the upper cutoff frequency of the second low-pass filter.

5. A Coriolis mass flow/density meter for measuring a mass flow rate of a fluid flowing through a pipe, said flow meter comprising:

at least one vibrating flow tube for conducting the fluid;

vibrator means for vibrating said flow tube;

an inlet-side first vibration sensor for generating a first sensor signal representing inlet-side vibrations of said flow tube;

an outlet-side second vibration sensor for generating a second sensor signal representing outlet-side vibrations of said flow tube;

said sensor signals having a phase difference with respect to each other that varies with the mass flow rate; and a measurement circuit fed by the first and the second sensor signal for providing a mass flow rate signal representing the mass flow rate of said fluid, said measurement circuit including a first signal converting means for generating a start signal, a second signal converting means for generating a stop signal, a time-to-digital converter being controlled by the start signal and the stop signal for generating a digital signal representing a time difference between said start signal and said stop signal, a signal selecting means coupled to the first and the second vibration sensor, and said first and said second signal converting means being coupled to the signal selecting means.

6. The Coriolis mass flow/density meter as claimed in claim 5, wherein:

the signal selecting means is operable to take a first switching position and a second switching position during operation, in said first switching position of the signal selecting means the first signal converting means is coupled to the first vibration sensor and the second signal converting means is coupled to the second vibration sensor, and in said second switching position of the signal selecting means the first signal converting means is coupled to the second vibration sensor and the second signal converting means is coupled to the first vibration sensor.

7. The Coriolis mass flow/density meter as claimed in claim 5, wherein the first and the second signal converting means include first and second zero-crossing detecting means, said first and second zero-crossing detecting means delivering the start and the stop signal, respectively.

8. The Coriolis mass flow/density meter as claimed in claim 7, wherein at least the second signal converting means includes signal delaying means for shifting in time the fed sensor signal, said signal delaying means being coupled to the second zero-crossing detecting means in such a manner that the stop signal is delayed with respect to the start signal independent of the actual mass flow rate of the fluid.

9. The Coriolis mass flow/density meter as claimed in claim 8, wherein the first signal converting means includes signal delaying means for shifting in time the fed sensor signal, said signal delaying means being coupled to the first zero-crossing detecting means.

10. The Coriolis mass flow/density meter as claimed in claim 9, wherein the signal delaying means of the first signal converting means includes a first low-pass filter.

11. The Coriolis mass flow/density meter as claimed in claim 10, wherein:

the signal delaying means of the second signal converting means includes a second low-pass filter, the first low-pass filter has an upper cutoff frequency, the second low-pass filter has an upper cutoff frequency, and the upper cutoff frequency of the first low-pass filter differs from the upper cutoff frequency of the second low-pass filter by about 10% to 15%.

12. The Coriolis mass flow/density meter as claimed in claim 8, wherein the signal delaying means of the second signal converting means includes a second low-pass filter.

13. A Coriolis mass flow/density meter for measuring a mass flow rate of a fluid flowing through a pipe, said Coriolis mass flow/density meter comprising:

at least one vibrating flow tube for conducting the fluid;

a vibrator for vibrating said flow tube;

an inlet-side first vibration sensor for generating a first sensor signal representing inlet-side vibrations of said flow tube;

an outlet-side second vibration sensor for generating a second sensor signal representing outlet-side vibrations of said flow tube, said sensor signals having a phase difference with respect to each other that varies with the mass flow rate; and a measuring circuit fed by both sensor signals for providing a mass flow rate signal representing the mass flow rate of said fluid, said measuring circuit including a time-to-digital converter being controlled by a start signal and a stop signal for generating a digital signal representing a time difference between said start signal and said stop signal;

wherein the start signal is generated by means of the first sensor signal and the stop signal is generated by means of the second sensor signal, temporarily;

wherein the start signal is generated by means of the second sensor signal and the stop signal is generated by means of the first sensor signal, temporarily; and wherein under normal operating conditions the stop signal is ever delayed with respect to the start signal independent of the actual mass flow rate of said fluid, disregarding which sensor signal currently being selected for generating the start signal.

14. The Coriolis mass flow/density meter as claimed in claim 13, wherein the measuring circuit further includes:

a first zero-crossing detector for generating the start signal, said zero-crossing detector being coupled selectively to one of the first and the second vibration sensor, and a second zero-crossing detector for generating the stop signal, said second zero-crossing detector being coupled selectively to one of the first and the second vibration sensor when the one of the first and the second vibration sensor is currently not coupled to the first zero-crossing detector.

15. The Coriolis mass flow/density meter as claimed in claim 14, wherein the measuring circuit further includes a time delaying means coupled at least to the second zero-crossing detector for shifting in time said one of the two sensor signals currently being selected for generating the stop signal.

16. The Coriolis mass flow/density meter as claimed in claim 13, wherein the time delaying means includes at least one low pass-filter having an input selectively coupled to one of the first and second vibration sensor, and further having an output coupled to the second zero-crossing detector.

17. The Coriolis mass flow/density meter as claimed in claim 13, wherein the measuring circuit further includes an intermediate switch for selectively coupling the first and the second vibration sensor to the first and the second zero-crossing detector, respectively.

18. A method for measuring a mass flow rate of a fluid flowing through a pipe by means of a Coriolis mass flow/density meter, said method comprising the steps of:

vibrating a flow tube which is conducting said fluid;

detecting inlet-side and outlet-side vibrations of said flow tube for generating a first sensor signal representing said inlet-side vibrations and a second sensor signal representing said outlet-side vibrations, said sensor signals having a phase difference with respect to each other that varies with the mass flow rate; and generating a measuring signal representing the mass flow rate to be determined by means of both sensor signals;

wherein said step of generating the measuring signal includes the steps of generating a start signal and a stop signal by means of both sensor signals, said stop signal being delayed with respect to said start signal independent of the actual mass flow rate of said fluid, and starting a time-to-digital converter by means of the start signal and stopping said time-to-digital converter by means of the stop signal for generating a digital signal that represents a time difference between said start signal and said stop signal.

19. The method as claimed in claim 18, wherein:

the step of generating the start signal includes the step of selecting one of said sensor signals, and the step of generating the stop signal includes the steps of selecting from said sensor signals a signal currently being not selected for generating the start signal, and shifting in time a signal currently being selected for generating the stop signal.

20. The method as claimed in claim 18, wherein the step of generating the measuring signal further includes the step of accumulating the digital signal by means of a microprocessor.

21. The method as claimed in claim 20, wherein the step of generating the measuring signal further includes the step of calculating a mean time difference by means of a plurality of accumulated digital signals, said plurality of accumulated digital signals representing a sequence of determined time differences between said start signal and said stop signal.

22. The method as claimed in claim 18, wherein the step of generating the measuring signal further includes the steps of:

allocating a positive algebraic sign to digital signal in case of the first sensor signal being selected for generating the start signal, and allocating a negative algebraic sign to digital signal in case of the second sensor signal being selected for generating the start signal.

\* \* \* \* \*